United States Patent [19]

Kehr et al.

[11] Patent Number: 4,510,097

[45] Date of Patent: Apr. 9, 1985

[54] HINDERED ALIPHATIC MONOISOCYANATES

[75] Inventors: Clifton L. Kehr, Silver Spring; Walter R. Wszolek, Sykesville; Nelson S. Marans, Silver Spring, all of Md.

[73] Assignee: W. R. Grace & Co., New York, N.Y.

[21] Appl. No.: 962,543

[22] Filed: Nov. 20, 1978

[51] Int. Cl.³ .......................................... C07C 119/045
[52] U.S. Cl. ................................................ 260/453 A
[58] Field of Search ...................... 260/453 A, 453 AR

[56] References Cited

U.S. PATENT DOCUMENTS 3,873,540  3/1975  Fuchs et al. .......................... 544/223

OTHER PUBLICATIONS

Maddox et al., J. Med. Chem., vol. 8, pp. 230–235 (1965).

Mueller et al., Chemical Abstracts, vol. 62, 16047–16049 (1965).

*Primary Examiner*—Dolph H. Torrence
*Attorney, Agent, or Firm*—Richard P. Plunkett; William W. McDowell, Jr.

[57] ABSTRACT

This invention relates to novel hindered cycloaliphatic monoisocyanates of the general formula:

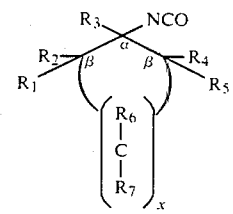

wherein $R_1$–$R_7$ are members of the group consisting of H, alkyl, cycloalkyl, aryl, alkaryl, aralkyl or mixtures thereof wherein the alkyl groups contain 1–18 carbon atoms, the cycloalkyl groups contain 4–8 carbon atoms and the aryl groups contain 6–14 carbon atoms with the proviso that where $R_3$ is a group member other than H, $R_1$, $R_2$, $R_4$ and $R_5$ can be H and with the further proviso that where $R_3$ is H at least two of $R_1$, $R_2$, $R_4$ and $R_5$ are group members other than H and x is 1 to 7. Other novel dihindered intermediate compositions include aliphatic monoamines.

1 Claim, No Drawings

HINDERED ALIPHATIC MONOISOCYANATES

This invention relates to hindered compounds of cyclo-aliphatic monoisocyanates and dihindered aliphatic monoamines.

PRIOR ART

There are a few dihindered cycloaliphatic monoamines that have been previously prepared in the prior art including 2,3,6-triphenylcyclohexylamine, 2,6-dimethyl-cyclohexylamine, 6-methyl-2-benzylcyclohexylamine, 2,4,6-trimethylcyclohexylamine, 2,6-dipropylcyclohexylamine, 6-methyl-2-ethylcyclohexylamine, 2,6-diethylcyclohexylamine and 2,5-dimethylcyclopentylamine. These materials are prepared mainly from their aromatic precursors which, in turn, are mainly prepared from aromatic nitro precursors.

THE INVENTION

This invention relates to novel hindered aliphatic monoisocyanates of the general formula:

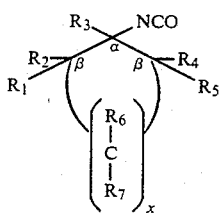

wherein $R_1$–$R_7$ are members of the group consisting of H, alkyl, cycloalkyl, aryl, alkaryl, aralkyl or mixtures thereof wherein the alkyl groups contain 1–18 carbon atoms, the cycloalkyl groups contain 4–8 carbon atoms and the aryl groups contain 6–14 carbon atoms with the proviso that where $R_3$ is a group member other than H, $R_1$, $R_2$, $R_4$ and $R_5$ can be H and with the further proviso that where $R_3$ is H at least two of $R_1$, $R_2$, $R_4$ and $R_5$ are group members other than H and x is 1 to 7.

Examplary hindered aliphatic monoisocyanates within the confines of the formula include, but are not limited to, 1-methylcyclohexylisocyanate; 1,2,6-trimethylcyclohexylisocyanate; 2,2,6-trimethylcyclohexylisocyanate; 1,2-dimethylcyclohexylisocyanate; 2,6-dimethylcyclohexylisocyanate; 2,6-diethylcyclohexylisocyanate; 2,2,6,6-tetramethylcyclohexylisocyanate; 1,2,2,6,6-pentamethylcyclohexylisocyanate.

Other novel dihindered intermediate compositions include cycloaliphatic monoamines of the general formula:

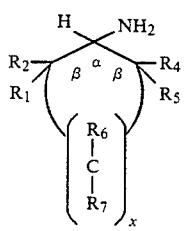

wherein $R_1$, $R_2$ and $R_4$–$R_7$ are members of the group consisting of H, alkyl, cycloalkyl, alkaryl or mixtures thereof wherein the alkyl groups contain 1–18 carbon atoms, the cycloalkyl groups contain 4–8 carbon atoms and the alkaryl groups contain 7–14 carbon atoms with the proviso that at least two of $R_1$, $R_2$, $R_4$ and $R_5$ are group members other than H with the further proviso that, when only two of $R_1$, $R_2$, $R_4$ and $R_5$ are alkyl, at least one of the alkyl groups contains at least 4 carbon atoms, and x is 1 to 7.

Examplary species of these dihindered aliphatic monoamines include, but are not limited to, 2,2,6-trimethylcyclohexylamine; 2,2,6,6-tetramethylcyclohexylamine; 2,6-dibutylcyclohexylamine; 2-butyl, 6-ethylcyclohexylamine; 2-iso-butyl, 6-methylcyclohexylamine and the like.

As used herein, a hindered cycloaliphatic monoisocyanate means the α-position contains an alkyl, aryl, cycloalkyl, alkylaryl or arylalkyl substituent and di- or polyhindered cycloaliphatic isocyanate or amine means the α and β carbons contain a minimum of two substituents and a maximum of five substituents where the substituents may be alkyl, cycloalkyl, aryl, alkylaryl or arylalkyl. Herein the above isocyanates and amines will collectively be referred to as hindered.

The monoisocyanates herein can be used as amine scavengers in polyurethanes, epoxies, polyamides and other polymeric compositions. The dihindered aliphatic monoamines can be used to make the aliphatic isocyanates herein.

There are two general synthetic routes for preparing dihindered aliphatic monoisocyanates. In more detail and more specifically the first route is by nitration of the substituted aromatic compound, reduction of the aromatic nitro compound to the aromatic amine, reduction of the aromatic amine to the cycloaliphatic amine and phosgenation of the aliphatic amine. Alternatively, the aromatic amine can be formed and alkylated to give the desired intermediate dihindered aromatic amine.

The first route includes nitration in the 2-position of a 1,3-disubstituted aromatic compound using nitric acid, per se, or in conjunction with sulfuric acid at a temperature in the range 0°–150° C. For example, the mononitration of m-xylene can be accomplished by the addition of 1.08 moles of sulfuric acid (81% conc.) per mole of xylene and 10% excess nitric acid at a temperature of 30° C. for a one hour reaction period. Yields of about 90% of mononitro-m-xylene are obtained. See Kobe and H. M. Brennecke, Industrial & Engineering Chemistry, Vol. 46, No. 4, pages 728–732. Reduction of the nitro compound to the amine using a reduction catalyst such as Raney nickel is then carried out under hydrogen pressures of 1–100 atmospheres and temperatures in the range 0°–150° C. Alternatively, nitrobenzene can be hydrogenated to aniline and the aniline alkylated using the desired olefin or alkyl halide. For example, aniline in the presence of ethylene can be converted to the 2,6-diethylaniline by the known Ethyl process using aluminum anilide as a catalyst at 325° C. and 800 psi. Alkylation can also be conducted on the ortho-substituted anilines to give mixed alkyl derivatives in the 2,6 position such as the reaction of o-toluidine with ethylene to give 2-methyl, 6-ethylaniline. Reduction from the aromatic nitro to the aromatic amine can be accomplished by standard methods described in Coll. Vol. I–V Index of Organic Synthesis, p. 211. Selected catalysts and conditions are covered therein. The ring hydrogenation is covered on pp. 208 and 209 to give the corresponding cycloaliphatic from the aromatic compounds. All the above prior art references are incorporated herein by reference. Reduction of the aromatic amine to an aliphatic amine is then accomplished in the presence of a hydrogenation catalyst such as Raney nickel or cobalt or rhodium/Al₂O₃ at hydrogen pressures of 2–200 atmospheres and a temperature ranging from 0°–250° C. The thus formed aliphatic amine is phosgenated as the free amine, the amine hydrochloride, the amine-carbon dioxide adduct or any other suitable amine salt without or with a solvent (such as o-dichlorobenzene) in the presence of excess phosgene. The phosgenation reaction can be performed in either one or two temperature stages. In the single stage the reaction mixture is heated to 80°–180° C. while in the two temperature stage reaction, the first temperature stage is in the range of minus 20° to plus 20° C. and the second stage from 20° C. to 200° C. at pressures in the range of atmospheric to 50 atmospheres. A specific example of the above total route would be the nitration of m-xylene in the presence of nitric and sulfuric acid to obtain 2,6-dimethylnitrobenzene and by-products, thusly:

m-xylene                   2,6-dimethylnitrobenzene

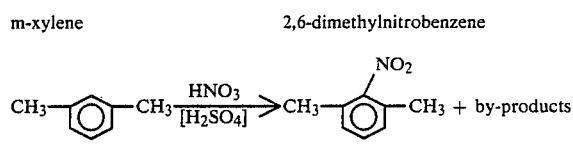

The 2,6-dimethylnitrobenzene is reduced to the amine, i.e., 2,6-dimethylaniline in the presence of a Raney nickel catalyst at a temperature of 25° C. and a pressure of 70 atmospheres:

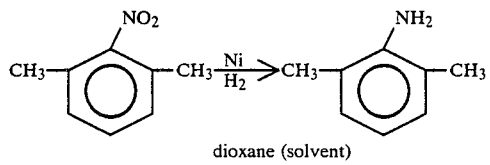

dioxane (solvent)

Mesidine (2,4,6-trimethylaniline) can be obtained in a similar manner by nitration of mesitylene followed by reduction. The aromatic amine is then reduced to an aliphatic amine with hydrogen in the presence of a hydrogenation catalyst such as Rh/Al₂O₃ in the range of 150 atmospheres and a temperature range of 90°–100° C., thusly:

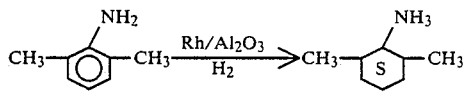

The thus formed 2,6-dimethylcyclohexylamine is then phosgenated to 2,6-dimethylcyclohexylisocyanate in the presence of chlorobenzene or dichlorobenzene solvent using excess phosgene and a two-stage temperature reaction wherein the first stage is carried out at −20° to 20° C. and the second from 110° to 180° C. while maintaining the reaction at a pressure in the range of 1 to 15 atmospheres:

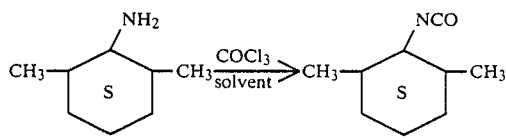

The alternative steps in the first route may be written as follows:

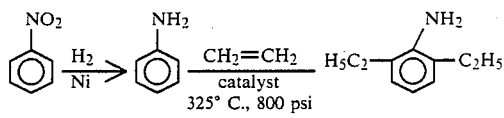

and the dihindered aromatic amine can then be reduced and phosgenated to give 2,6-diethylcyclohexylisocyanate.

A second general route to forming the dihindered aliphatic monoisocyanates is to use as starting materials a cyclic ketone (or the cyclic alcohol oxidized to the ketone) and treating same with hydroxylamine to form the corresponding oxime. The thus formed oxime is then reduced either using H₂ and catalyst or H₂ generating couples (Na—alcohol) to give the amine. The aliphatic monoamine is then phosgenated to obtain the monoisocyanate as set out supra. For example, 2,6-dimethylcyclohexanone is treated with hydroxylamine hydrochloride and Na₂CO₃ at a temperature in the range 0° to 50° C. and 1–10 atmospheres to form 2,6-dimethylcyclohexyloxime:

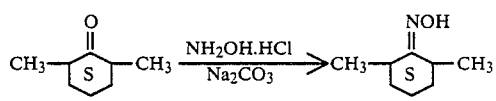

The thus formed oxime is thereafter reduced in the presence of a Na—alcohol couple to 2,6-dimethylcyclohexylamine at a temperature in the range 0° to 80° C. at 1–5 atmospheres pressure:

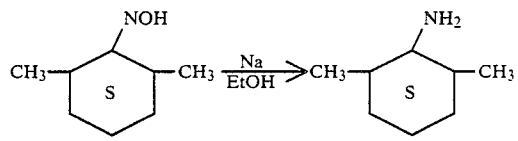

Amine is then dissolved in o-dichlorobenzene and in the presence of excess phosgene with the reaction being performed in two temperature stages with the first temperature stage in the range −20° to 20° C. and the second from 20° to 200° C. with pressures ranging from 1 to 15 atmospheres to form 2,6-dimethylcyclohexylisocyanate, thusly:

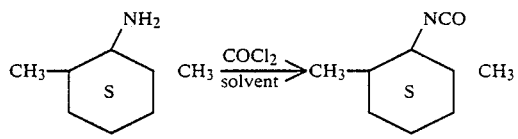

Alternately, the same compound can be prepared through 2-methylcyclohexanone. 2,6-Dimethylcyclohexanone has been prepared by formylation of 2-methylcyclohexanone in the 6-position, methylation at the 6-position and removal of the formyl group. The ketone may then be aminated and phosgenated to give the 2,6-dimethylcyclohexylisocyanate.

Special monohindered cycloaliphatic amines and isocyanates can be prepared with the substituent in the 1-position of the cycloaliphatic radical. A typical amine would be the 1-phenyl-1-cyclohexylamine, a typical isocyanate 1-phenyl-1-cyclohexylisocyanate. These compounds can be prepared through the following route. 1-phenylcyclohexanol is available from a number of supply houses (Aldrich). The 1-phenylcyclohexanol can be converted to the corresponding iodide using potassium iodide and polyphosphoric acid. The phenylcyclohexyliodide can then be converted to the amine through the reaction with potassium phthalimide and subsequent hydrolysis with hydrochloric acid to give the amine hydrochloride. The amine hydrochloride can be converted to the amine by use of sodium hydroxide or may be used directly for phosgenation to the corresponding isocyanate:

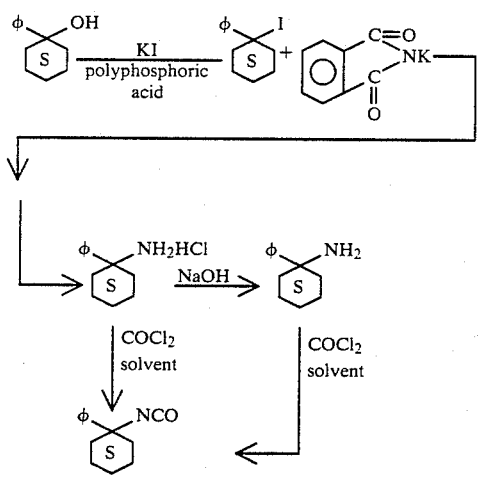

The following example is set out to explain, but expressly not limit, the instant invention. Unless otherwise noted, all parts and percentages are by weight.

EXAMPLE 1

50 g of known 2,6-diethylcyclohexylamine was dissolved in 230 g of chlorobenzene in an addition funnel. In a separate multiple neck, round bottom flask equipped with stirrer, phosgene and nitrogen inlets and outlets, reflux condenser and thermometer, 200 g of $COCl_2$ was condensed in 230 g of chlorobenzene while maintaining the flask at about $-5°$ C. in a bath of acetone cooled with dry ice. The aforesaid amine solution was added dropwise to the flask over a 10 minute period with stirring at 600 rpm while maintaining the reaction temperature in the range $-5°$ to $-3°$ C. After addition, stirring was continued at 300 rpm while the flask contents were allowed to warm to 130°–135° C. and excess phosgene was distilled. The reaction was continued for 1¾ hrs. with stirring while additional $COCl_2$ was passed through the reaction mixture. Nitrogen was then sparged through the flask to flush out excess phosgene and hydrogen chloride. The product was freed of chlorobenzene solvent by stripping on a Roto-Vap at 73° C. The residue was distilled under vacuum (0.1 mm Hg) and the fraction boiling between 58°–61° C. was collected. The yield was 45.6 g (78% theoretical). IR showed a strong NCO absorption. NMR revealed the product to be free of contaminants and to have the desired structure, i.e.,

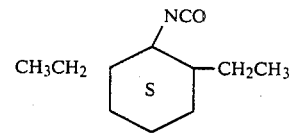

Elemental analysis found C=70.97, H=10.30, O=9.33, N=7.95 whereas theoretical is C=72.93, H=10.50, O=8.84 and N=7.73.

EXAMPLE 2

A prepolymer was prepared by admixing 2 molar equivalents of polyethylene glycol having an average molecular weight of 1,000 (PEG-1,000) and one molar equivalent of trimethylolpropane (TMOP). The admixture was dried at 100°–110° C. under a pressure of 5–15 Torr to remove water. The resulting dried mixture was slowly added over a period of about one hour to a vessel containing 6.65 molar equivalents of toluene diisocyanate (TDI) while stirring the TDI and polyol mixture. The temperature was maintained at 60° C. The mixture was maintained at 60° C. with stirring for three additional hours. Then an additional 1.05 molar equivalent of TDI was added with stirring over a period of about one hour while maintaining the temperature at 60° C. The final reaction mixture contained a 10% molar excess of TDI. All hydroxyl groups were capped with isocyanate and some chain extension occurred because of crosslinking of the polyols with TDI.

The following example shows the use of the hindered aliphatic monoisocyanate as amine scavengers in a polyurethane foam:

EXAMPLE 3

100 g of the prepolymer reaction mixture from Example 2 supra were admixed with 4 g of 2,6-diethylcyclohexyl isocyanate in a beaker. In a separate beaker 2 g of a non-ionic polyether based surfactant sold under the tradename "Pluronic L-62" by BASF-Wyandotte and 100 g of water were admixed. The two admixtures were combined in a Waring blender and admixed with agitation. The resultant foam after ovendrying for ½ hour at 65° C. was analyzed in accord with the method described in the article by J. L. Guthrie and R. W. McKinney, published in the September, 1977 issue of Analytical Chemistry, pp. 1676–1680. The amine content was less than 1.0 ppm. In a control run wherein no 2,6-diethylcyclohexyl isocyanate was added to the system, the foam contained 14.3 ppm of toluene diamine.

We claim:
1. 2,6-diethylcyclohexylisocyanate.

* * * * *